A. J. CAPSTRAW.
BUMPER.
APPLICATION FILED AUG. 14, 1920.

1,371,145. Patented Mar. 8, 1921.

Inventor
A.J.Capstraw,
By Geo. P. Kimmel
Attorney

UNITED STATES PATENT OFFICE.

ARTHUR J. CAPSTRAW, OF DETROIT, MICHIGAN.

BUMPER.

1,371,145.  Specification of Letters Patent.  Patented Mar. 8, 1921.

Application filed August 14, 1920. Serial No. 403,481.

*To all whom it may concern:*

Be it known that I, ARTHUR J. CAPSTRAW, a citizen of the United States, residing at Detroit, in the county of Wayne and State of Michigan, have invented certain new and useful Improvements in Bumpers, of which the following is a specification.

This invention relates to automobile attachments and more particularly to bumpers for motor vehicles.

The object of the invention is to provide a convertible bumper and tow-line.

Another object is to provide a device of this character so constructed that it may be readily converted from a bumper to a tow-line and vice versa whereby the vehicle may always be prepared for an emergency and yet not be required to carry burdensome apparatus useful only in an emergency.

With these and other objects in view, the invention consists in certain novel features of construction as hereinafter shown and described and then specifically pointed out in the claims and in the drawings illustrative of the preferred embodiment of the invention.

Figure 1:
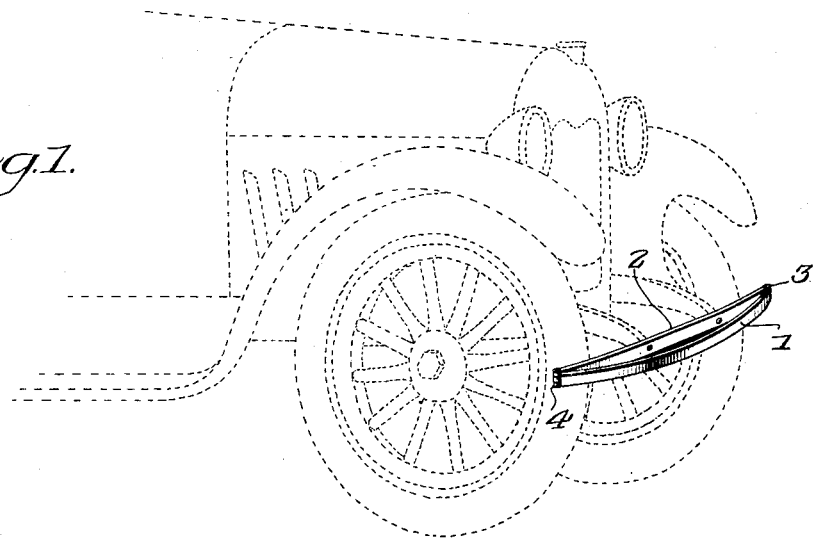
Figure 1 represents a perspective view of the front part of an automobile equipped with this improved attachment.
Figure 2:
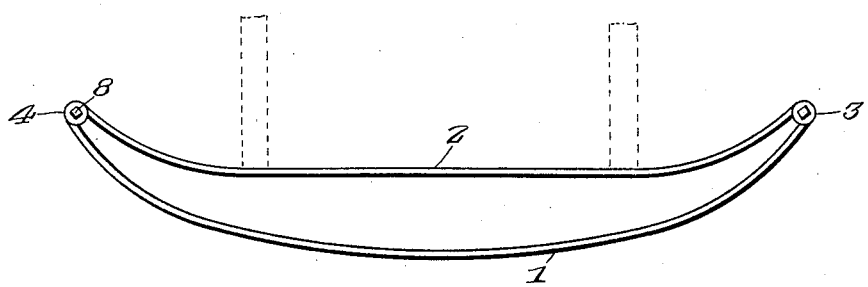
Fig. 2 is a top plan view of the attachment ready for use as a bumper.
Figure 4:
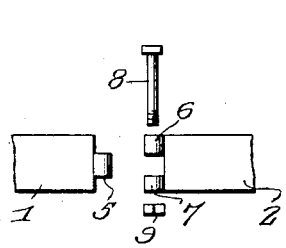
Fig. 4 is a detail transverse section thereof.
Figure 5:
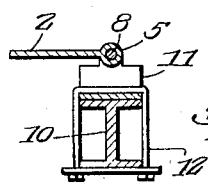
Fig. 5 is a detail transverse section.

In the embodiment illustrated the attachment constituting this invention is composed of two strips or bars 1 and 2 of high grade spring steel. These strips are curved longitudinally as shown in Fig. 2 and are hingedly connected at their ends as shown at 3 and 4. One of these hinge connections is readily separable to adapt the device to be used as a tow-line in an emergency. The detachable hinge connection is preferably constructed as shown in Fig. 4 the member 1 having a hinge knuckle 5 extending longitudinally therefrom midway the width thereof while the adjacent end of section 2 is provided with two transversely spaced longitudinally extending hinge knuckles 6 and 7 designed to receive between them the knuckle 5 through which passes a bolt 8 equipped with the usual nut 9 to provide for the ready separation of the sections at this point when desired.

Mounted on the front axle 10 of the vehicle is a clevis 11 positioned midway the length of the axle and which is designed for connection to one end of the attachment when the sections thereof are open for use as a tow-line. This clevis 11 may be of any suitable construction it being here shown U-shaped in form with the terminals thereof upstanding and apertured to receive between them the knuckle carrying end of one of the sections 1 or 2 and through which is passed the bolt 8 for connecting the attachment to the axle. This U-shaped clevis 11 may be fastened to the axle in any desired manner clips 12 being here shown for this purpose.

When the sections 1 and 2 are connected at both ends for use as a bumper they may obviously be secured to the chassis of the vehicle in any desired manner.

Figure 3:
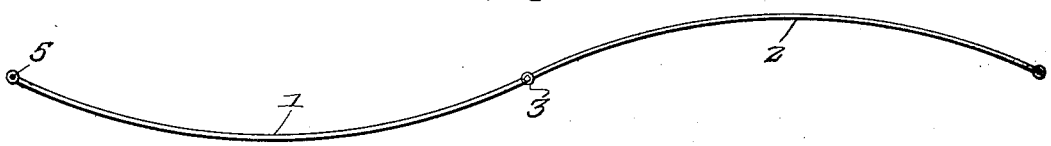
Fig. 3 is a side elevation of the device open for use as a tow-line.

In the use of this attachment as a tow-line the sections are disconnected at one end and opened out into the position shown in Fig. 3 one end being connected with the clevis 11 of the vehicle to be towed while the other end is designed for connection to the vehicle to be used in towing the disabled vehicle.

It will thus be seen that this attachment performs the double function of a bumper and a tow-line and when not in use as a tow-line is mounted for use as a bumper avoiding the necessity of carrying a cumbersome tow-line in the tool box or in any other place in the vehicle.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. A convertible bumper and tow-line comprising sections hingedly connected for use as a bumper and separable to open into longitudinal alinement for use as a tow-line.

2. A convertible bumper and tow-line comprising sections hingedly connected for use as a bumper and separable to open into longitudinal alinement for use as a tow-line, said sections each being longitudinally curved in the same direction.

3. A two-piece bumper the ends of the members of which are hingedly connected one of said connections being detachable to permit the members to be opened into longitudinal alinement for use as a tow-line.

4. The combination with a vehicle having an axle provided with a clevis midway its ends; of a convertible tow-line and bumper composed of sections hingedly connected one of said connections being separable to provide attaching means for engagement with the clevis.

In testimony whereof, I affix my signature hereto.

ARTHUR J. CAPSTRAW.